United States Patent
Rangarajan et al.

(10) Patent No.: US 7,797,506 B2
(45) Date of Patent: *Sep. 14, 2010

(54) THERMAL CONTROL OF MEMORY MODULES USING PROXIMITY INFORMATION

(75) Inventors: Madhusudhan Rangarajan, Round Rock, TX (US); Allen Chester Wynn, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/356,259

(22) Filed: Jan. 20, 2009

(65) Prior Publication Data

US 2009/0125695 A1    May 14, 2009

Related U.S. Application Data

(63) Continuation of application No. 11/467,353, filed on Aug. 25, 2006, now Pat. No. 7,500,078.

(51) Int. Cl.
*G06F 12/00* (2006.01)

(52) U.S. Cl. .................. 711/170; 711/105; 711/165; 365/211; 365/212

(58) Field of Classification Search .............. 711/170, 711/105, 165; 365/211, 212
See application file for complete search history.

(56) References Cited

U.S. PATENT DOCUMENTS

| | | | |
|---|---|---|---|
| 6,233,190 B1 | 5/2001 | Cooper et al. | 365/212 |
| 6,535,798 B1 | 3/2003 | Bhatia et al. | 700/293 |
| 6,552,945 B2 | 4/2003 | Cooper et al. | 365/212 |
| 6,564,288 B2 | 5/2003 | Olarig et al. | 711/105 |
| 6,662,278 B1 | 12/2003 | Kahn et al. | 711/154 |
| 6,778,453 B2 | 8/2004 | Cooper et al. | 365/212 |
| 6,922,787 B2 | 7/2005 | Karpel et al. | 713/320 |
| 7,191,088 B1 | 3/2007 | Reed et al. | 702/130 |
| 7,260,007 B2 | 8/2007 | Jain et al. | 365/212 |
| 2004/0243534 A1* | 12/2004 | Culter et al. | 707/1 |
| 2006/0041729 A1* | 2/2006 | Rider et al. | 711/165 |
| 2006/0253633 A1 | 11/2006 | Brundridge et al. | 710/104 |
| 2007/0211548 A1 | 9/2007 | Jain et al. | 365/211 |
| 2007/0214333 A1 | 9/2007 | Nijhawan et al. | 711/165 |
| 2007/0233967 A1 | 10/2007 | Rangarajan et al. | 711/147 |

* cited by examiner

*Primary Examiner*—Stephen C Elmore
(74) *Attorney, Agent, or Firm*—Baker Botts L.L.P.

(57) ABSTRACT

An information handling system includes a processor having access to a system memory. The system is operable to detect a thermal alert and identify an associated portion of system memory. The system may then modify memory allocation information used by an operating system to allocate system memory. When the thermal alert indicates a rising memory module temperature that exceeds a specified threshold, the modification of the memory allocation information causes the memory to appear to be more "distant" from the system processor(s) and thereby allocated less preferentially than other memory. If the temperature continues to rise beyond a higher threshold, a second modification of the memory allocation information is performed to simulate a "hot eject" of the memory module. As the memory module cools, the memory allocation information can be restored to simulate a hot add of the memory module and to restore the proximity of the memory module.

17 Claims, 7 Drawing Sheets

| | TYPE | LEN | P.D. | Res'd | BL | BH | LENL | LENH | Res'd | FLAGS | Res'd |
|---|---|---|---|---|---|---|---|---|---|---|---|
| | 1 | 1 | 1 | 5 | 4 | 4 | 4 | 4 | 4 | 4 | 8 |
| 202-1 | 1 | 40 | 204 | | 208 | 210 | 212 | 214 | | 220 | |
| 202-2 | 1 | 40 | | | | | | | | | |

206

201

SRAT 200

FIG. 2

| | | 304-0 | 304-1 | | |
|---|---|---|---|---|---|
| 302-0 | | 0 | 1 | | N-1 |
| | 0 | 306 | 308 | | |
| 302-1 | 1 | | | | |
| | N-1 | | | | |

401

SLIT 300

FIG. 3

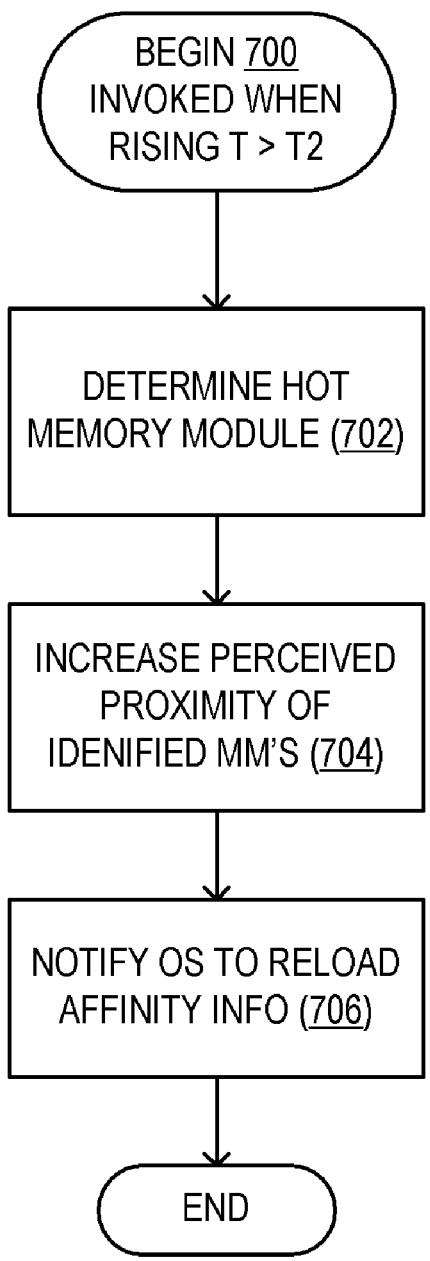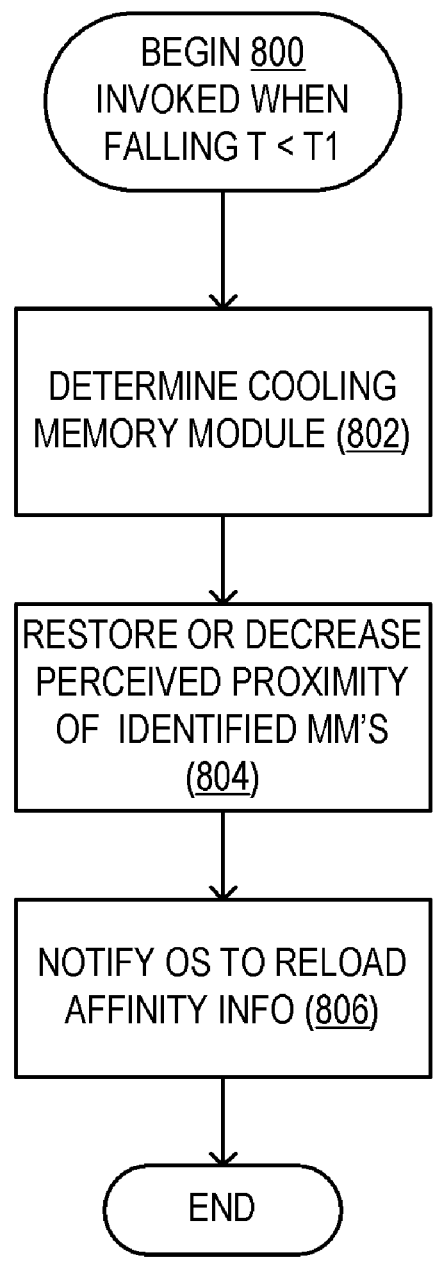
FIG. 7
FIG. 8

THERMAL CONTROL OF MEMORY MODULES USING PROXIMITY INFORMATION

CROSS REFERENCE TO RELATED APPLICATION

This application is a continuation of U.S. patent application Ser. No. 11/467,353 filed Aug. 25, 2006, now U.S. Pat. No. 7,500,078, the contents of which is hereby incorporated by reference in its entirety.

TECHNICAL FIELD

The present invention is related to the field of computer systems and, more particularly, thermal control in computer systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a server, which is a processor-based network device that manages network resources. As examples, a file server is dedicated to storing files, a print server manages one or more printers, a network server manages network traffic, and a database server processes database queries. A Web server services Internet World Wide Web pages.

A server may be implemented as a "stand alone" or monolithic servers in which a single chassis contains a single set of processing resources and an associated set of I/O resources. A multiprocessor monolithic server may, for example, include two or more processors that share access to a common system memory and a common set of peripheral devices including persistent storage resources, network interface resources, graphical display resources, and so forth. In other implementations, some of the I/O resources available to the server are provided as external components. Persistent storage, for example, may be provided to a monolithic server as an external box.

In more recent years, servers have been implemented as "blade servers." Blade servers are so named because they employ server blades, which are thin, modular electronic circuit boards containing one or more microprocessors, memory, and other server hardware and firmware. Blade servers, which are sometimes referred to as a high-density servers, typically include a space saving, rack-based chassis that accepts multiple server blades. Blade servers are often used in clusters of servers dedicated to a single task. For example, a blade server may function as a web server by servicing web-based requests addressed to one or more universal resource locators (URLs). In this implementation, the blade server may route individual requests to different server blades within the blade server based on factors including the current loading of individual blades and the locality of information required to respond to a request, all in a manner that is transparent to the user.

Power management and power conservation is an increasingly important consideration in the design and implementation of all information handling systems in general and server system especially. Power consumption is not only costly, but it also generates heat that must be dissipated to maintain performance parameters as well as the electrical and mechanical integrity of the server. Traditional thermal management efforts have tended to focus on techniques for performance "throttling" by, for example, slowing the speed of the system clock, reducing the number of instructions processed per unit of time interval, reducing the operating voltages, and so forth. While traditional thermal management techniques have utility, they tend to have a negative performance impact that is generally undesirable.

SUMMARY OF THE INVENTION

Therefore a opportunity exists for an information handling system operable to provide thermal management over at least some of its resources without a substantial performance impact. The present disclosure describes a system and method for thermal management of system memory resources by manipulating information used by the operating system in allocating memory to executing threads.

In one aspect, an information handling system as described includes at least one processor having access to a system memory. The system is operable to detect a thermal alert and identify a portion of system memory associated with the thermal alert. The system responds to the thermal alert by modifying memory allocation information used by an operating system to allocate system memory. When the thermal alert indicates a rising memory module temperature that exceeds a specified threshold, the modification of the memory allocation information causes the memory to appear to be more "distant" from the system processor(s). Distant memory is allocated less preferentially than "near" memory thereby resulting in the distant memory being used less than other memory. The reduced usage gives the distant memory an opportunity to recover thermally. If the temperature of the memory module continues to rise beyond a higher threshold, a second modification of the memory allocation information is performed that simulates a "hot eject" of the memory module. Hot ejecting a memory module eliminates that portion of system memory as memory that can be allocated by the operating system, thereby again giving the memory the opportunity to recover thermally.

Detecting the thermal alert may include detecting a signal issued by a thermal sensor located in proximity to a memory module where the identified portion of system memory corresponds to a portion of system memory contained in or otherwise implemented in the memory module. Modifying memory allocation information may include modifying memory affinity information, such as memory affinity information defined by the ACPI specification, to alter the perceived proximity of the identified portion of system memory.

The modification of memory affinity information may be combined with conventional performance throttling techniques in a tiered approach where, for example, performance throttling is attempted if the memory module temperature rises above a first threshold, perceived proximity is increased if the temperature rises above a higher threshold, and the hot eject is simulated if the temperature rises above a still higher threshold.

In another aspect, a disclosed method of implementing thermal control in an information handling system includes detecting a thermal alert indicative of a temperature of a memory module exceeding a specified threshold, identifying a portion of system memory address space associated with the memory module, and modifying memory allocation information associated with the identified portion of system memory address space. Modifying memory allocation information may include modifying memory allocation information used by an operating system to identify memory for allocating to a requesting thread. Modifying memory allocation information includes may also include increasing a perceived proximity between a processor of the information handling system and the identified portion of system memory address space.

In yet another aspect, a disclosed computer program product includes computer executable instructions, stored on a computer readable medium, for thermal control of a memory module, including instructions for detecting a thermal alert associated with the memory module, instructions for identifying a portion of system memory address space associated with the identified memory module; and instructions for modifying memory allocation information associated with the identified portion of system memory address space to reduce an operating system preference for allocating the identified portion of system memory address space.

The present disclosure includes a number of important technical advantages. One technical advantage is the ability to respond to increasing memory module temperatures with corrective action that does not have a direct impact on performance.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein:

FIG. 2 is a conceptual representation of a memory affinity data structure within a resource allocation table;

FIG. 3 is a conceptual representation of a locality information table;

FIG. 7 is a flow diagram illustrating additional detail of one implementation of a thermal control method;

FIG. 8 is a flow diagram illustrating additional detail of one implementation of a thermal control method;

DETAILED DESCRIPTION OF THE INVENTION

Figure 1:
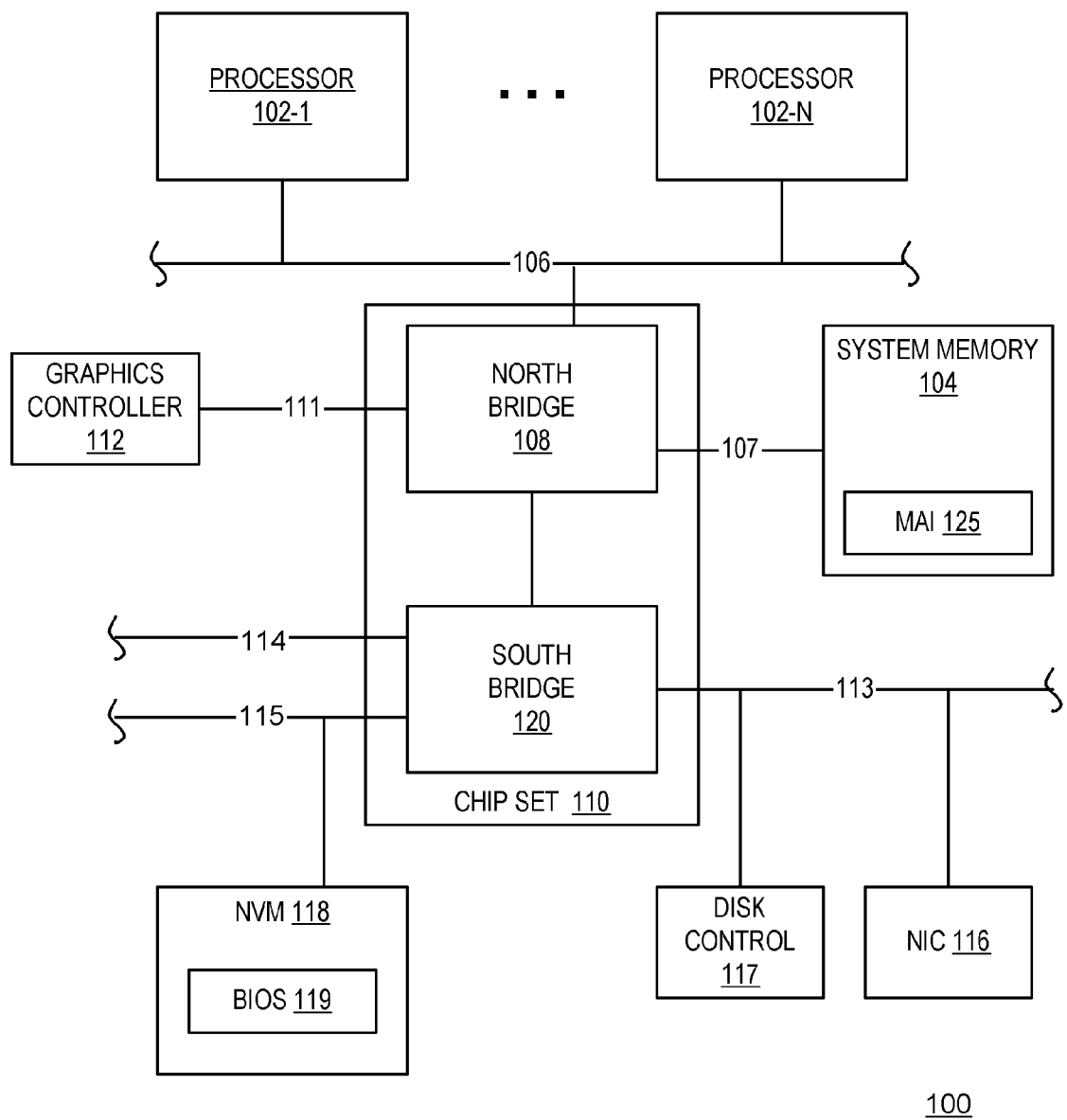
FIG. 1 is a block diagram showing selected elements of an information handling system.

Preferred embodiments of the invention and its advantages are best understood by reference to the drawings wherein like numbers refer to like and corresponding parts.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Preferred embodiments and their advantages are best understood by reference to FIG. 1 through FIG. 5, wherein like numbers are used to indicate like and corresponding parts. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In one aspect, a system and method suitable for modifying or otherwise maintaining processor/memory affinity information in an information handling system as corrective action in response to a thermal warning or alert. Specifically, a system and method may include detecting a thermal warning or alert originating from or otherwise associated with a memory module, such as a dual in-line memory module (DIMM), that represents a distinct portion of system memory. The system and method may address the thermal warning or alert by modifying information, referred to herein generically as memory allocation information, that affects the manner in which an operating system allocates system memory. By modifying the allocation information, appropriately, the system and method make the "hot" memory appear undesirable to the operating system as an allocation target. Unless system memory resources are saturated, the operating system will respond to the modified allocation information by allocating system memory to other portions of system memory. As a result, the hot memory will be less utilized and the hot memory will, hopefully, begin to cool due to lack of activity.

In the preferred embodiment, the system and method the memory allocation information used to implement thermal control is memory affinity information of which the operating system is already aware. Although memory affinity information is typically designed for use in distributed memory systems where there are substantial differences in memory access times depending upon the processor requesting memory access and the memory to which the request is directed. In one embodiment of the present application, however, the memory affinity information is useful for thermal control even in a symmetrical architecture (i.e., an architecture in which memory access time is largely independent of the requesting processor and the memory access module.

Turning now to FIG. 1, selected elements of an embodiment of an information handling system 100 suitable for implementing a thermal control technique based on memory allocation is depicted. The depicted implementation is exemplary of a server class information handling system although the described thermal control methods are fully applicable to desktop, laptop, and hand held information handling systems. In server class implementations, the information system may be implemented as a monolithic or blade type server. Throughout this disclosure hyphenated reference numerals refer to instances of an element that is represented generically or collectively by the reference numeral without hyphenation. Thus, elements 10-1 and 10-2, as examples, refer to first and second instances of an element 10, which may be referred to generically or collectively as element(s) 10.

In the depicted implementation, information handling system 100 includes one or more processors 102-1 through 102-n (generically or collectively referred to herein as processor(s) 102). Processors 102 are connected to a shared system bus 106. Information handling system 100 as depicted includes a chip set 110 that includes a north bridge 108 and a south bridge 120. North bridge chip 108 is operable as a memory controller that provides an interface between system bus 106 and a memory bus system memory 104. In addition, the depicted embodiment of north bridge 108 is shown as providing an advanced graphics port (AGP) interconnect 111 that interfaces to a graphics controller 112 or other form of video controller.

South bridge 120 connects to north bridge 108 and provides peripheral busses including, in the depicted implementation, a PCI (Peripheral Components Interface) bus 113, a USB (Universal Serial Bus) 114 and, an ISA (Industry Standard Architecture) or other form of legacy peripheral bus 115. In the depicted embodiment, a network interface card or adapter (NIC) 116 and a disk controller 117 are connected to PCI bus 113 while a non volatile memory (NVM) 118 containing a BIOS 119 is connected to ISA bus 118. NVM 118 may be implemented as a flash memory, a PROM (Programmable Read Only Memory), or other suitable form of non volatile, but preferably programmable storage.

Although the depicted implementation of information handling system 100 describes a specific architecture and set of components, other implementations are equally applicable. For example, although north and south bridge 108 and 120 are illustrated and described as being distinct elements, they may be integrated into a single piece of silicon or integrated within a single integrated circuit package. Similarly, although the depicted embodiment implements a memory controller in north bridge 108, other embodiments may incorporate the memory controller function directly into processors 102-1 through 102-N. In these embodiments, the AGP bus provided by north bridge 108 may be provided by south bridge 120 or the AGP bus may be replaced by another bus, an express PCI bus, for example, that is provided by South Bridge 120.

Figure 11:
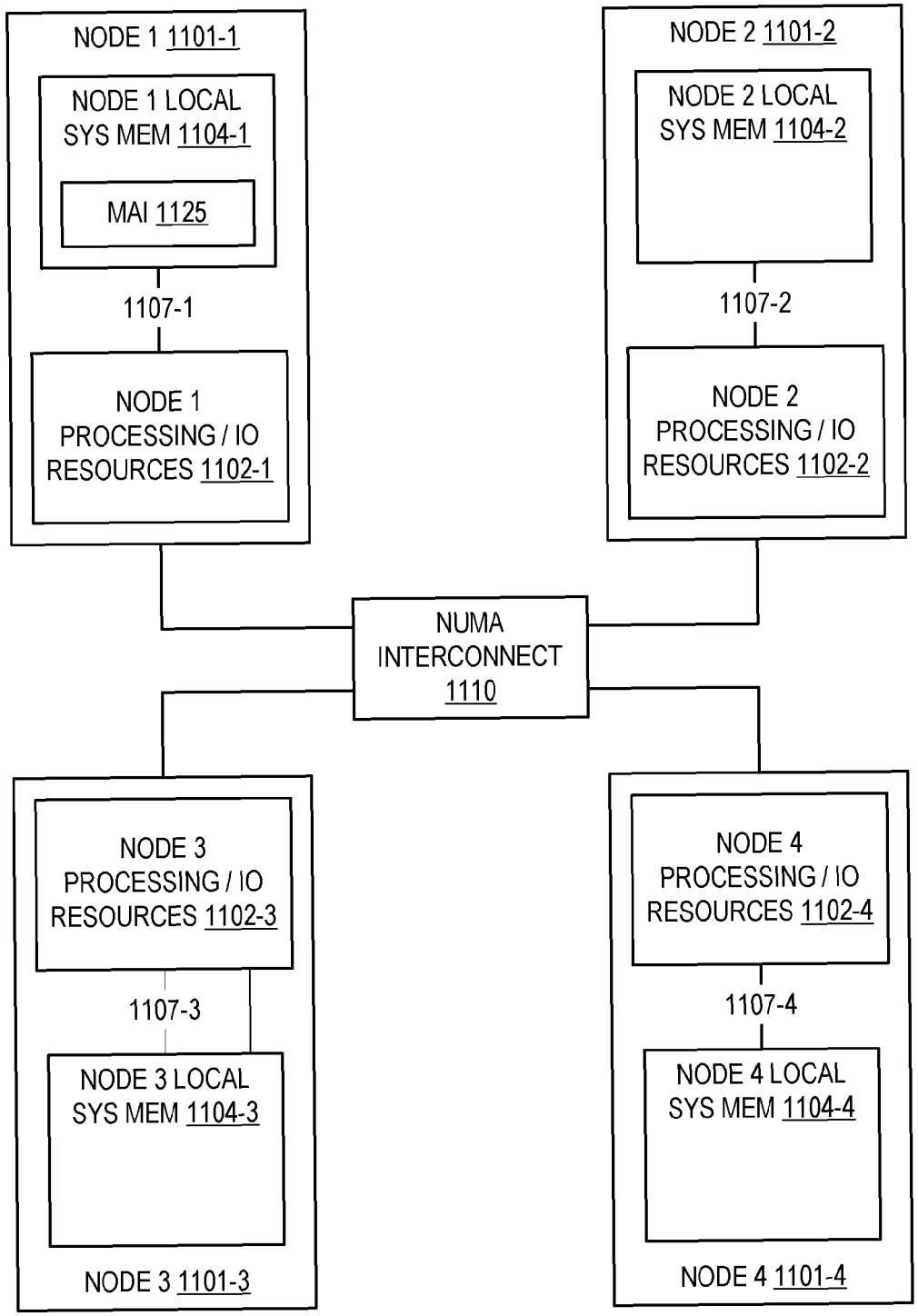
FIG. 11 is a block diagram of selected elements of an embodiment of an NUMA (non-uniform memory architecture) information handling system suitable for implementing the thermal control method of FIG. 4.

FIG. 11 depicts a non-uniform memory architecture (NUMA) embodiment of an information handling system 1100. Information handling system 1100 is suitable for implementing thermal control methods described herein. NUMA information handling system 1100 includes nodes 1101-1 through 1101-4 interconnected via a NUMA interconnection 1110. Each node 1101 includes processing and I/O resources represented by reference numeral 1102 and a local system memory 1104. Local system memories 1104, as suggested by their names, are portions of the information handling system memory that are local to or "close to" the processing and I/O resources of the node. Thus, for example, local system memory 1104-1 is local to processing/I/O resources 1102-1, and so forth. All portions of system memory not local to a node are referred to as remote portions of system memory. For example, local system memories 1104-2, 1104-3, and 1104-4 are remote portions of system memory relative to first node 1101-1. In a NUMA system such as NUMA information handling system 1100, memory latency access time is a function of system memory address whereas, in a conventional uni-processor or symmetrical multiprocessor system, memory access time is substantially independent of system memory address. In NUMA system 1100 the access time for remote portions of system memory is significantly different (i.e., greater) than the access time for local system memory.

NUMA system 1100 as implemented in FIG. 11 includes four nodes and two tiers of access times. The first tier access time is the access time associated with all local accesses to system memory. A local access is an access by a processing or I/O resource of a node to a portion of system memory that resides in the local system memory of that node. The second tier represents all accesses to remote memory. In this implementation, all remote accesses have a substantially uniform latency. In more complex implementations, a number of nodes may be substantially greater than four and the number of access time tiers may exceed two. For example, a system may employ an architecture in which two or more NUMA interconnect segments must be traversed to access a particular portion of system memory. The latency associated with accesses that must traverse multiple interconnect segments, sometimes referred to as "hops," will be greater than the latency associated with a single hop.

Regardless of the complexity of a particular NUMA implementation, NUMA system 1100 preferably includes memory affinity information (MAI) 125 stored in a portion of the system memory. Although FIG. 11 depicts MAI 125 stored in local system memory 1104-1, MAI 125 may be stored in any one or more of nodes 1101. MAT 125, as described in greater detail below, conveys information indicative of the memory architecture of the system. MAI 125 may include, for example, information indicating which system memory addresses are located on which nodes 1101, and the relative "distances" between any pair of nodes. In this context, the "distance" between a pair of nodes may refer to the number of NUMA interconnect hops between the two nodes. In such embodiments, the MAI 125 may facilitate NUMA implementations by providing an operating system with information it can use to allocate memory accesses efficiently, e.g., by allocating processing threads to execute on a node where most of the system memory accesses executed by the thread are local accesses. In the context of thermal control techniques as described herein, thermal control techniques may leverage the presence of MAI 125 and extend the function of the MAI to encompass more than the physical architecture of the system. In any event, FIG. 1 and FIG. 11 depict different implementations of information handling systems suitable for employing thermal control techniques as described herein.

In one embodiment, BIOS 119 includes code that, among other things, generates memory allocation information 125 that is shown as being stored in system memory 104, preferably in a portion of system memory 125 that is reserved for BIOS access. In one embodiment, memory allocation information 125 includes processor/affinity information, which may include, a static resource affinity table (SRAT) 200 and/or a system locality information table (SLIT) 300 as described in greater detail below with respect to FIG. 2 and FIG. 3.

As used throughout this specification, memory allocation information refers to information used to control or otherwise affect that manner in which a processor allocates memory while affinity information refers to information indicating a proximity relationship between portions of system memory and processors of the system. Affinity information is generally used in multi-node server systems in which memory access is non-uniform. See, e.g., U.S. patent application of V. Nijhawan et al., entitled Modifying Node Descriptors to Reflect Memory Migration in an Information Handling System with Non-Uniform Memory Access, application Ser. No. 11/372,569 filed Mar. 10, 2006 (referred to hereinafter as the "Nijhawan application"). As disclosed herein, however, affinity information may be used to bias the operating system against allocating selected portions of system memory for purposes, including thermal recovery, that are unrelated to processor/memory proximity.

Some embodiments of memory allocation information 125 include processor/memory affinity information that is formatted in compliance with the Advanced Configuration and Power Interface (ACPI) standard. ACPI is an open specification that establishes industry standard interfaces for operating system directed configuration and power management on laptops, desktops, and servers. ACPI is fully described in the *Advanced Configuration and Power Interface Specification* revision 3.0a (the ACPI specification) from the Advanced Configuration and Power Interface work group (www.ACPI-.info). The ACPI specification and all previous revisions thereof is incorporated in its entirety by reference herein. Moreover, as subsequent ACPI Specifications are developed, those specifications are applicable herein as well.

ACPI includes, among other things, a specification of the manner in which memory affinity information is formatted. ACPI defines formats for two data structures that provide processor/memory affinity information. These data structures include a Static Resource Affinity Table (SPAT) and a System Locality Information Table (SLIT).

FIG. 2 depicts a conceptual representation of an SPAT 200, which includes a memory affinity data structure 201. Memory affinity data structure 201 includes a plurality of entries 202-1, 202-2, etc. (generically or collectively referred to herein as entry/entries 202). Each entry 202 includes values for various fields defined by the ACPI specification. More specifically, each entry 202 in memory affinity data structure 201 includes a value for a proximity domain field 204 and memory address range information 206. In the case of a multi-node server, for example, the proximity domain field 204 contains a value that indicates the node on which the memory address range indicated by the memory address range information 206 is located. In the implementation depicted in FIG. 2, memory address range information 206 includes a base address low field 208, a base address high field 210, a low length field 212, and a high length field 214. Each of the fields 208 through 214 is a 4-byte field. The base address low field 208 and the base high field 210 together define a 64-bit base address for the relevant memory address range. The length fields 212 and 214 define a 64-bit memory address offset value that, when added to the base address, indicates the high end of the memory address range. Other implementations may define a memory address range differently (e.g., by indicating a base address and a high address explicitly) Memory affinity data structure 201 as shown in FIG. 2 also includes a 4-byte field 220 that includes 32 bits of information suitable for describing characteristics of the corresponding memory address range. These characteristics include, but are not limited to, whether the corresponding memory address range is hot pluggable.

Referring now to FIG. 3, a conceptual representation of one embodiment of a SLIT 300 is depicted. In the depicted embodiment, SLIT 300 includes a matrix 301 having a plurality of rows 302 and an equal number of columns 304. Each row 302 and each column 304 correspond to an object of $ server 100. Under ACPI, the objects represented in SLIT matrix 301 include processors, memory controllers, and host bridges. Thus, the first row 302 may correspond to a particular processor in $ server 100. The first column 304 would necessarily correspond to the same processor. The values in SLIT matrix 301 represent the relative $ distance between the locality object corresponding to the row and the locality object corresponding to the column. Data points along the diagonal of SLIT 300 represent the distance between a locality object and itself. The ACPI specification arbitrarily assigns a value of 10 to these diagonal entries in SLIT matrix 301. The value 10 is sometimes referred to as the SMP distance. The values in all other entries of SLIT 300 represent the $ distance relative to the SMP distance. Thus, a value of 30 in SLIT 300 indicates that the $ distance between the corresponding pair of locality objects is approximately 3 times the SMP distance. The locality object information provided by SLIT 300 may be used by operating system software to facilitate efficient allocation of threads to processing resources.

Some embodiments of using memory allocation information to provide thermal control for system resources are implemented in whole or in part with a set of computer executable instructions (software) stored on a computer readable medium such as the system memory or a hard disk. When executed by a suitable processor, the instructions cause the computer to perform a thermal control function illustrated generically in FIG. 4 and in additional detail according to one embodiment, in FIG. 6-9.

Figure 4:
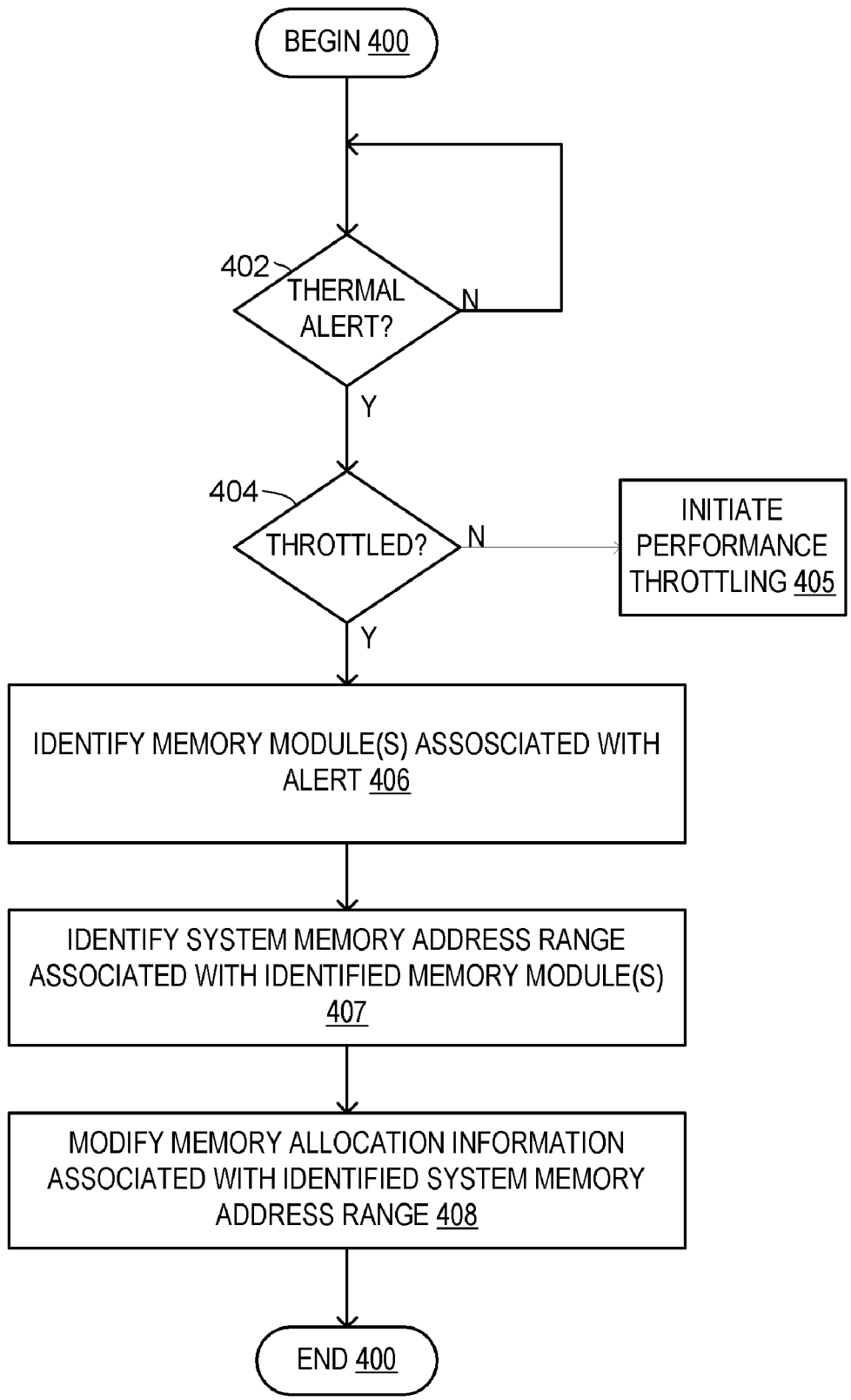
FIG. 4 is a flow diagram illustrating selected elements of a method for providing thermal control in the information handling system of FIG. 1.

Turning now to FIG. 4, selected elements of an embodiment of a method 400 for providing thermal control for an element or resource of information handling system 100 are illustrated. In the illustrated embodiment, the element or resource to which thermal control is provided is system memory 104. System memory 104 is likely implemented with two or more modular components frequently referred to as memory modules. Information handling system 100 may include a plurality of memory module components. These components may be implemented, for example, as Dual Inline Memory Modules (DIMMs) containing any suitable form of system memory including, as examples, double data rate (DDR) memory, double data rate 2 (DDR2) memory, and fully buffered DIMM (FBD) memory.

Figure 5:
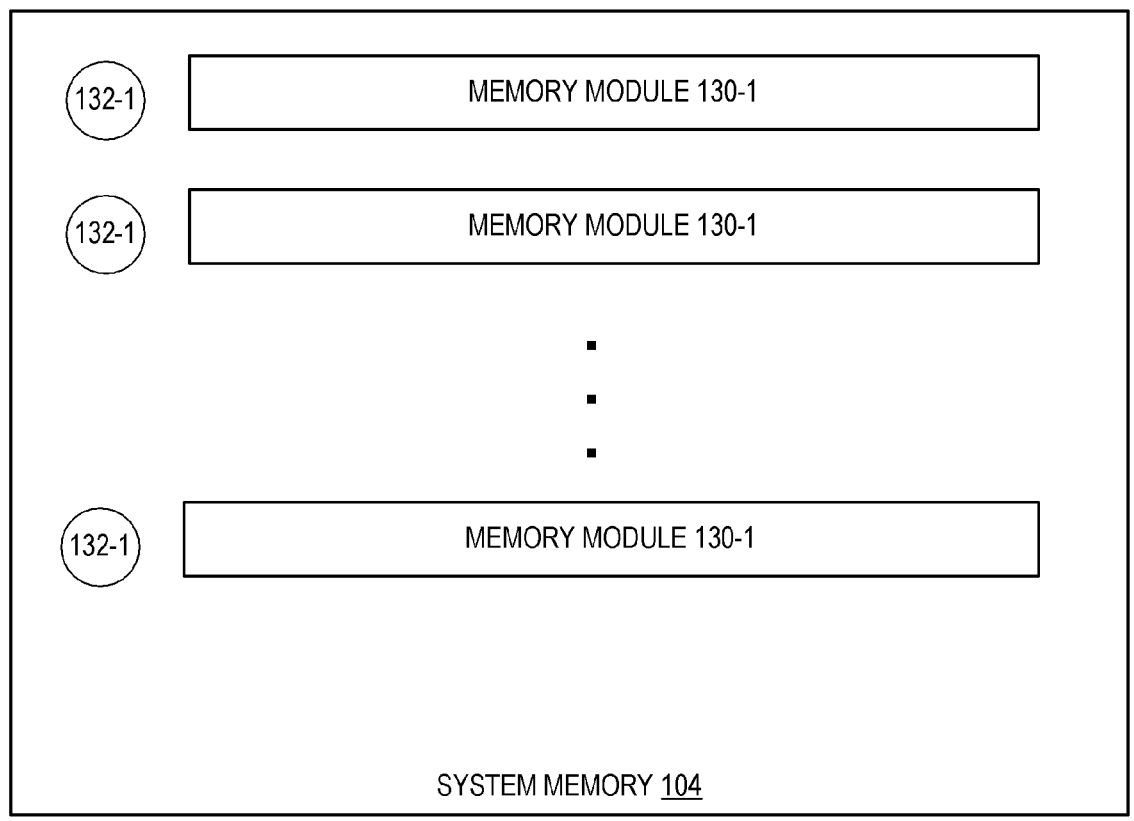
FIG. 5 is a block diagram showing selected elements of a system memory of the information handling system of FIG. 1.

As depicted in FIG. 4, method 400 includes monitoring (block 402) an information handling system for an interrupt, signal, or other form of information indicative of a thermal alert or warning associated with the system memory. Referring briefly to FIG. 5, an implementation of system memory 104 emphasizes the use of a plurality of memory modules 130-1 through 130-N. Memory modules 130 as depicted in FIG. 5 may represent DIMMs or another form of memory module suitable for use in a microprocessor-based information handling system. Each memory modules 130 as shown includes, in addition to its RAM (random access memory) devices (not shown explicitly), a thermal sensor 132. Thus, for example, memory module 130-1 includes a corresponding thermal sensor 132-1, memory module 130-N includes a corresponding memory module 132-N, and so forth. Although the thermal sensors 132 are indicated in FIG. 5 as being "on" a memory module, specific implementations may also include the thermal sensors in close proximity, but not physically on, the corresponding memory module. Moreover, although FIG. 5 illustrates a one-to-one correspondence between memory modules 130 and thermal sensors 132, other embodiments may use fewer thermal sensors, e.g., a thermal sensor 132 associated with two or more adjacent memory modules 130.

Returning now to FIG. 4, memory alert monitoring 402 may include information handling system 100 detecting a thermal alert associated with one or more memory modules 130. In response to detecting the thermal alert in block 402, the depicted embodiment of method 400 includes determining (block 404) if one or more forms of performance throttling have been pursued. In this embodiment, performance throttling is a first option for responding to a thermal alert. In other embodiments, however, performance throttling may be designated as a secondary procedure that is not pursued memory allocation information 125 is modified as described herein.

In the depicted embodiment of method 400, performance throttling 406 is pursued as a first technique for responding to thermal alert. Performance throttling 406 as represented in FIG. 4 encompasses various performance throttling techniques known by those skilled in the field. Such techniques would include, frequency throttling, voltage scaling, and various forms of throttling processor performance by reducing the number of instructions processed per unit time.

If method 400 determines in block 404 that performance throttling has already been implemented in the information handling system, method 400 attempts to address the thermal alert by causing an operating system to reduce it preference for or usage of a portion of system memory that corresponds to a portion of system memory that is associated with the thermal alert. Accordingly, method 400 includes determining which portion of system memory is associated with an alert.

In the depicted embodiment of method 400, determining which portion of system memory 104 is associated with an alert includes identifying (block 406) a memory module 130 that is associated with the thermal sensor 132 that issued the alert. Memory modules 130 represent distinct portions of system memory 104 that are readily associated with thermal alerts triggered by thermal sensors 132. In embodiments having a one-to-one correspondence between memory modules 130 and thermal sensors 132, identifying the memory modules 130 associated with a thermal alert includes determining which thermal sensor 132 caused an alert and determining which memory module(s) 130 are associated with the determined thermal sensor 132. Identifying the thermal sensor that issued an alert may be achieved by providing the identity of the thermal sensor as part of the thermal alert. If, for example, the thermal alert is an interrupt, the thermal alert preferably includes information identifying the thermal sensor 132 and the interrupt handler triggered by the alert may include identifying the memory module 132 associated with the identified thermal sensor.

After determining a memory module 130 or other portion of system memory 104 associated with a thermal alert, method 400 includes determining (block 407) the portion of system memory corresponding to the identified memory module by identifying the range of system memory addresses associated with the identified memory module(s) 130. Information handling system 100 preferably includes a table or mapping containing information regarding the range of system memory addresses corresponding to each memory module 130. From this information, method 400 can associate a system memory address range associated with a thermal alert.

Method 400 as depicted includes modifying (block 408) the perceived proximity of the range of system memory addresses identified in block 407. By modifying the perceived proximity of a range of system memory addresses, method 400 provides a form of corrective action following a thermal alert associated with one or more memory modules 130. Specifically, if the thermal alert indicates an over-temperature condition, the corrective action represented by block 408 includes increasing the perceived proximity of a system memory address range. The system memory address range for which perceived proximity is increased preferably corresponds precisely with the system memory addresses associated with the memory module 130 associated with the thermal alert.

In some cases, however, it is possible that the granularity and/or boundaries of system memory address ranges that may be modified using affinity information does not correspond precisely to the system memory address ranges corresponding to the physical memory modules 130. In such cases, the modification of perceived proximity information in block 408 includes identifying the best fit between a range of system memory address space corresponding to a memory module 130 associated with a thermal alert and a range of system memory address space alterable through affinity information.

As indicated in the preceding paragraphs, thermal alerts may indicate an over temperature condition when a thermal sensor 132 senses a temperature exceeding some specified threshold. Thermal alerts may also indicate an under temperature condition, presumably occurring when a thermal sensor 132 that previously sensed an over temperature condition subsequently senses a reduced temperature that is below a specified threshold. To avoid excessive "thrashing" of the proximity information and the routines that adjust the information, preferred embodiments of information handling system 100 implement a buffer or hysteresis condition between a threshold in a rising temperature environment and a threshold in a decreased temperature (thermal recovery) environment. Moreover, some embodiments of method 400 implement two or more thresholds in each "direction," namely, a two or more thresholds in a temperature increasing direction and two or more corresponding recover thresholds.

Figure 6:
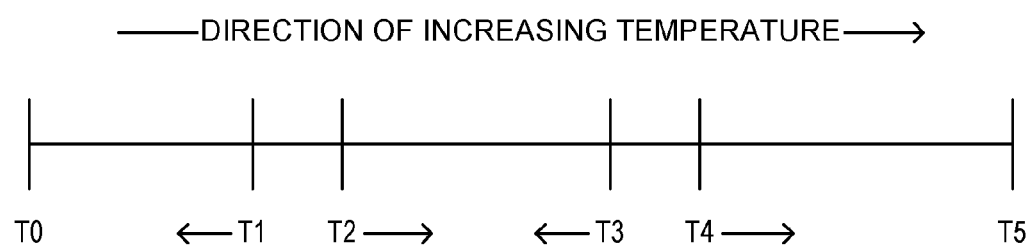
FIG. 6 is an illustration of the relationship between various temperature thresholds according to one embodiment.

Referring to FIG. 6, a line graph 600 is depicted to emphasize a specification implementation of corrective action taken in response to thermal alerts according to one embodiment of information handling system 100. As depicted in FIG. 6, line graph 600 includes seven specified temperature thresholds, identified as T0 through T6. These thresholds include three pairs of thresholds for various stages of corrective action and an ultimate threshold associated with a shut down situation.

More specifically, as depicted in FIG. 6, the temperature thresholds T0 and T1 are associated with a first level of corrective action, T2 and T3 are associated with a second level of corrective action, and T4 and T5 are associated with a third level of corrective action. The levels of corrective action may include implementing performance throttling, modifying perceived proximity, and simulating a hot eject of a memory module. The ordering of these levels of corrective action are an implementation detail that may vary from implementation to implementation. Generally, it is preferable to perform hot eject simulation only after modifying perceived proximity information, but the performance throttling may be positioned anywhere in the ordering of corrective action.

The embodiment depicted in FIG. 6 uses performance throttling as a first level of corrective action, proximity modification as a second level, and hot eject simulation as the third level. In this embodiment, T1 represents a threshold for implementing the first level of corrective action—performance throttling—and T0 represents a threshold for removing performance throttles. If a thermal sensor 132 senses a temperature exceeding threshold T1, one or more forms of performance throttling are initiated by information handling system 100. As indicated previously, performance throttling may include any of various types of performance throttling, but, generally, performance throttling refers to techniques that attempt to reducing thermal overload by reducing the speed or amount of processing activity.

Following initiation of the first level of corrective action, the temperature sensed by one or more thermal sensors may continue to rise, remain static, or drop. If the temperature continues to rise to a temperature equal to or exceeding the temperature corresponding to threshold T3, a second level of corrective action—e.g., proximity modification—is initiated.

Proximity modification according to an embodiment of the information handling system that includes SLIT information as described above may include modifying the SLIT information to increase the perceived proximity of a particular portion of system memory. If, for example, a single temperature sensor 132 senses a temperature in excess of the T3 threshold, information handling system 100 may increase the SLIT table value of the corresponding portion of system memory relative to all other portions of the system address range for all processors so that the "hot" portion of system memory address space is allocated less preferentially than all other portions. In this manner, a hot section of system memory will hopefully remain unallocated to any thread or process and thereby remain in a low power consumption state e.g., a standby or refresh-only state. Although a portion of system memory may be de-prioritized using memory affinity information as described, the portion of system memory is still, nevertheless, available for memory allocation. If the system memory is in very high demand, the operating system may be forced to allocate even those portions of system memory that appear to be distant. Presumably, however, the distant portions of system memory are among the last to be allocated and among the first to be de-allocated.

If the hot portion of memory remains in the unallocated state for a sufficient duration, it may cool sufficiently to a permit the temperature sensor to sense a temperature of less than the temperature indicated by threshold T2. A thermal alert may then be issued to indicate that the previous overtemperature condition has been resolved, at which point the proximity information may be restored or otherwise modified to bring the affected portion of system memory back to its original state, i.e., its original level of perceived proximity.

Following the second level of corrective action, the temperature of the hot portion of system memory could, once again, rise, remain static, or drop. If the temperature rises to temperature exceeding the temperature associated with threshold T5, a third level of corrective action is take. In one embodiment, the third level of corrective action may include simulating a hot eject of the memory module associated with the over temperature condition.

Commercially distributed operating systems, including ACPI-compliant operating systems, typically support hot adding and hot removing of memory modules. In information handling systems executing on such operating systems, as third level of corrective action might include configuring the system as if the memory module associated with the hot portion of system memory has been hot removed. Representing a memory module as having been hot ejected entirely prevents the operating system from allocating any activity to the module. Thus, this third level of corrective action is analogous to the second level, but makes the system memory portion entirely unavailable for allocation and, preferably, places the portion of system memory into a low power or no power state thereby accelerating the thermal recovery process.

If, in response to the third level of corrective action, the temperature cools below the temperature corresponding to threshold T4, the portion of system memory that was simulated as being hot removed is restored to a state of available memory. Restoring the portion of system memory in this case might include simulating the portion of system memory as being hot added under ACPI and the operating system.

Finally, as depicted in FIG. 6, if the third level of corrective action fails to stem the rising temperature associated with a memory module, a shut down temperature threshold T6 is provided. If a temperature sensor senses a temperature exceeding T6, the system preferably aborts all processing and begins an immediate power shut down to preserve system integrity. The shut down may include or omit routines to preserve data that is open or active at the time of a T6 thermal alert.

Turning now to the flow diagrams of FIGS. 7, 8, 9, and 10, specific embodiments of routines to implement some of the thermal alert handling techniques described above are presented. In FIG. 7, a method 700 exemplary of a thermal alert handling procedure invoked in response to a thermal sensor 132 sensing a temperature exceeding temperature threshold T2 as depicted in FIG. 6. In the embodiment as depicted in FIG. 7, method 700 includes identifying (block 702) a hot memory module. A memory range associated with the hot memory module is then determined by reference to a memory allocation table or descriptor and the memory range associated with the hot memory module is "marked" (block 704) as being distant from the processor(s) in information handling system 100. In embodiments, where affinity information is used to indicate the distance of the hot memory to the CPU, the operating system is notified to reload (block 706) the affinity information, which may include SPAT information, SLIT information, or both. Additional details of the manner in which information handling system can dynamically modify and reload ACPI compliant affinity information including SPAT and SLIT information is described in the Nijhawan application referenced above.

FIG. 8 depicts an embodiment of a method 800 for responding to a thermal alert issued when a temperature sensor sense a temperature drop below the temperature threshold T1 as depicted in FIG. 6 after having previously risen above temperature threshold T2 and thereby triggering the corrective action depicted in FIG. 7. Method 800 as depicted includes identifying (block 802) the memory module that cooled down and restoring (block 804) modifying the affinity information associated with the memory module. Preferably, the affinity information is modified by restoring the information to its original state (i.e., the state of the information that existed before method 700 described above was invoked) or otherwise reducing the perceived distance of the identified memory module. After restoring or otherwise modifying the affinity information, the operating system is requested or notified to reload (block 706) the affinity information.

Figure 9:
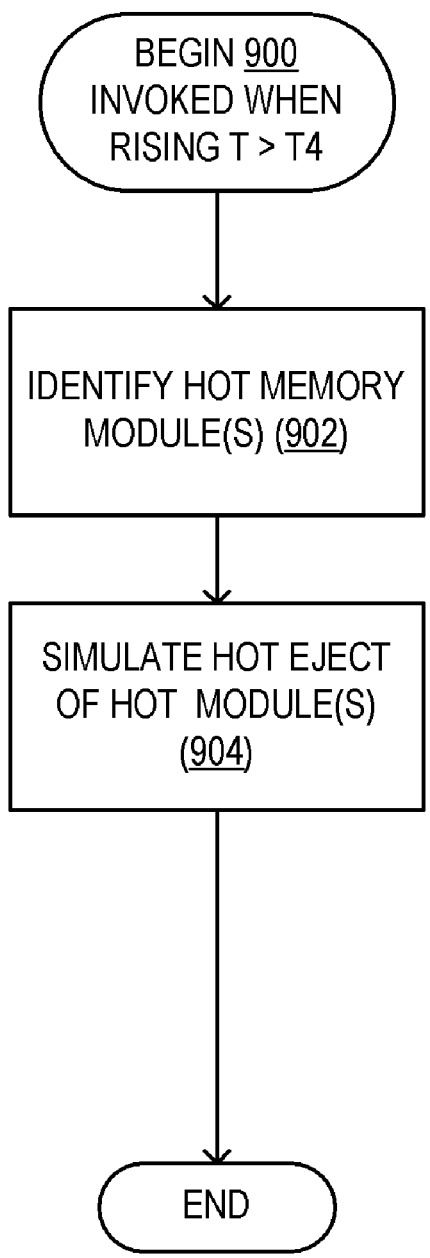
FIG. 9 is a flow diagram illustrating additional detail of one implementation of a thermal control method.
Figure 10:
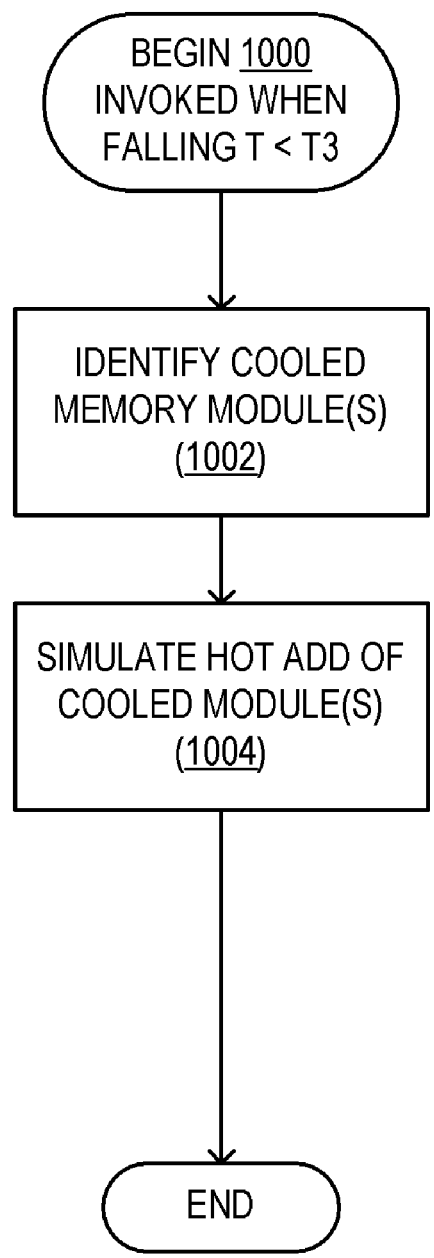
FIG. 10 is a flow diagram illustrating additional detail of one implementation of a thermal control method.

Method 900 as depicted in FIG. 9 is exercised in response to a thermal sensor detecting a temperature in excess of the temperature corresponding to threshold T5. Method 900 includes determining (block 902) the hot memory module and simulating (block 904) a hot remove or hot eject for the hot memory module and, in some embodiments, other memory modules in the same set of memory modules before restoring execution to the operating system. FIG. 10 depicts a method 1000 invoked in response to a temperature sensor dropping below the threshold indicated by temperature threshold T4. Method 1000 as depicted includes determining (block 1002) the memory module that has cooled down and simulating (block 1004) a hot add of the memory module such as by issuing an ACPI hot add command for the memory module before returning execution to the operating system.

Although the disclosed embodiments have been described in detail, it should be understood that various changes, substitutions and alterations can be made to the embodiments without departing from their spirit and scope

What is claimed is:

1. An information handling system, comprising:
   at least one processor having access to a system memory;
   the information handling system being operable to:
   detect a thermal alert and identify a portion of system memory associated with the thermal alert; and
   respond to the thermal alert by modifying memory allocation information used by an operating system to allocate system memory, including:
   simulating a hot eject of the identified portion of system memory responsive to detecting a thermal alert associated with a temperature exceeding a first threshold; and
   simulating a hot add of the identified portion of system memory responsive to detecting a thermal alert associated with a temperature that is below a second threshold.

2. The system of claim 1, wherein:
   detecting a thermal alert includes detecting a signal issued by a thermal sensor located in proximity to a memory module; and
   the identified portion of system memory corresponds to a portion of system memory implemented in the memory module.

3. The system of claim 1, wherein modifying memory allocation information includes modifying memory affinity information to alter the perceived proximity of the identified portion of system memory.

4. The system of claim 1, wherein the first and second thresholds are the same.

5. A method of implementing thermal control in an information handling system comprising:
   detecting a first thermal alert indicative of a temperature of a memory module exceeding a first specified threshold;
   in response to detecting the first thermal alert:
   identifying a portion of system memory address space associated with the memory module; and
   modifying memory allocation information associated with the identified portion of system memory address space to increase a perceived proximity of the portion of system memory address space associated with the memory module;
   detecting a second thermal alert indicative of a temperature of the memory module exceeding a second specified threshold; and
   in response to detecting the second thermal alert, simulating a hot eject of the identified portion of system memory address space.

6. The method of claim 5, wherein modifying memory allocation information includes modifying memory allocation information used by an operating system to identify memory for allocating to a requesting thread.

7. The method of claim 5, further comprising, responsive to a thermal alert indicative of a temperature of the memory module exceeding a third specified threshold, initiating performance throttling.

8. The method of claim 5, wherein the second specified threshold is greater than the first specified threshold.

9. A computer program product comprising computer executable instructions, stored on a computer readable medium, for thermal control of a memory module, comprising:
   instructions for detecting a thermal alert associated with the memory module;
   instructions for identifying a portion of system memory address space associated with the identified memory module; and
   instructions for modifying memory allocation information associated with the identified portion of system memory address space to reduce an operating system preference for allocating the identified portion of system memory address space;
   wherein modifying memory allocation information includes modifying Advanced Configuration and Power Interface standard(ACPI) memory affinity information including at least one of an ACPI Static Resource Affinity Table data structure and an ACPI System Locality Information Table data structure.

10. The computer program product of claim 9, further comprising instructions for increasing a perceived proximity of the identified portion of system memory address space in response to a temperature of the memory module rising above a first temperature threshold.

11. The computer program product of claim 10, further comprising instructions for decreasing a perceived proximity of the identified portion of system memory address space in response to a temperature of the memory module falling below a second temperature threshold.

12. The computer program product of claim 9, wherein the instructions for modifying memory allocation information include:
   instructions for increasing a perceived proximity of the portion of system memory address space responsive to a temperature of the memory module rising above a first specified threshold; and
   instructions for simulating a hot eject of the identified portion of system memory address space responsive to the temperature of the memory module rising above a second threshold.

13. The computer program product of claim 9, further comprising instructions for, responsive to detecting the thermal alert, initiating performance throttling either before or after modifying the memory allocation information.

14. A method of implementing thermal control in an information handling system, comprising:
   detecting a thermal alert associated with a memory module;
   identifying a portion of system memory address space associated with the memory module; and modifying memory allocation information associated with the identified portion of system memory address space to reduce an operating system preference for allocating the identified portion of system memory address space;

wherein modifying memory allocation information includes modifying Advanced Configuration and Power Interface standard(ACPI) memory affinity information including at least one of an ACPI Static Resource Affinity Table data structure and an ACPI System Locality Information Table data structure.

15. The method of claim 14, further comprising increasing a perceived proximity of the identified portion of system memory address space in response to a temperature of the memory module rising above a first temperature threshold.

16. The method of claim 15, further comprising decreasing a perceived proximity of the identified portion of system memory address space in response to a temperature of the memory module falling below a second temperature threshold.

17. The method of claim 14, wherein modifying memory allocation information includes:

increasing a perceived proximity of the portion of system memory address space responsive to a temperature of the memory module rising above a first specified threshold; and simulating a hot eject of the identified portion of system memory address space responsive to the temperature of the memory module rising above a second threshold.

* * * * *